United States Patent
Lin (10) Patent No.: US 11,752,397 B2
(45) Date of Patent: Sep. 12, 2023

(54) FULLY AUTOMATIC RACKET STRINGING SYSTEM

(71) Applicant: Huan-Hsiang Lin, Zhubei (TW)

(72) Inventor: Huan-Hsiang Lin, Zhubei (TW)

(*) Notice: Subject to any disclaimer, the term of this patent is extended or adjusted under 35 U.S.C. 154(b) by 400 days.

(21) Appl. No.: 16/987,953

(22) Filed: Aug. 7, 2020

(65) Prior Publication Data

US 2021/0346770 A1     Nov. 11, 2021

(30) Foreign Application Priority Data

May 6, 2020    (TW) .................................. 109115016

(51) Int. Cl.
| | |
|---|---|
| *A63B 51/14* | (2006.01) |
| *A63B 60/42* | (2015.01) |
| *B25J 9/16* | (2006.01) |
| *B25J 15/00* | (2006.01) |
| *B25J 13/08* | (2006.01) |
| *G05B 19/418* | (2006.01) |
| *G06T 7/00* | (2017.01) |

(52) U.S. Cl.
CPC .............. *A63B 51/14* (2013.01); *A63B 60/42* (2015.10); *B25J 9/1633* (2013.01); *B25J 9/1687* (2013.01); *B25J 9/1697* (2013.01); *B25J 13/08* (2013.01); *B25J 15/00* (2013.01); *B25J 15/0019* (2013.01); *G05B 19/41805* (2013.01); *G06T 7/001* (2013.01); *G05B 2219/50391* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 2012/0072021 A1* | 3/2012 | Walser | .................... | B25J 9/1612 |
| | | | | 700/254 |
| 2017/0080298 A1* | 3/2017 | Yadav | .................. | A63B 51/015 |
| 2019/0175994 A1* | 6/2019 | Williams | ................ | B25J 9/1682 |
| 2020/0173777 A1* | 6/2020 | Pivac | ....................... | G06T 7/292 |
| 2020/0318946 A1* | 10/2020 | Wolke | .................... | G03B 35/26 |

FOREIGN PATENT DOCUMENTS

| | | | | |
|---|---|---|---|---|
| FR | 2740046 A1 * | 4/1997 | ............. | A63B 51/14 |
| KR | 20190026508 * | 9/2017 | ............. | A63B 51/14 |
| TW | 202009039 A | 3/2020 | | |
| WO | WO-2018109713 A1 * | 6/2018 | | |

\* cited by examiner

*Primary Examiner* — Mohammad Ali
*Assistant Examiner* — David Earl Ogg
(74) *Attorney, Agent, or Firm* — Muncy, Geissler, Olds & Lowe, P.C.

(57) ABSTRACT

An automatic racket stringing system includes: two lens modules, respectively shooting a racket thread hole on a racket at a first preset position from different two angles, and the lens modules are based on the angles and determine a first relative coordinate of the racket line hole through a triangulation method; and a control unit controls a robotic arm to grab the racket from an initial position and move the racket to the first preset position; the control unit controls the robotic arm to a second preset position clamps a first end of a racket line, and when the first end of the racket line extends a preset length, it is cut by the robotic arm.

10 Claims, 11 Drawing Sheets

FULLY AUTOMATIC RACKET STRINGING SYSTEM

BACKGROUND OF THE INVENTION

This application claims priority of No. 109115016 filed in Taiwan R.O.C. on May 6, 2020 under 35 USC 119, the entire content of which is hereby incorporated by reference.

FIELD OF THE INVENTION

The invention relates to a racket stringing system, and more particularly to a fully automatic racket stringing system for pre-positioning coordinates of racket string holes and using a robot arm to finish stringing and tying operations.

DESCRIPTION OF THE RELATED ART

Various existing types of racket stringing methods are artificial. On the market, the racket stringing machine is used to only assist the racket stringing technician to perform racket stringing, and does not possess the fully automatic stringing ability. However, the stability of the racket depends on the skill of the racket stringing technician, and the stringing operation of one racket cannot be finished until more than a half hour of time has elapsed. So, the racket production or the racket string replacement cannot have the increased throughput or the replacement speed.

BRIEF SUMMARY OF THE INVENTION

An objective of the invention is to provide a fully automatic racket stringing system capable of inspecting whether the racket is abnormal.

An objective of the invention is to provide a fully automatic racket stringing system capable of detecting relative coordinates between racket string holes and a robot arm.

An objective of the invention is to provide a fully automatic racket stringing system capable of using the robot arm to cut off a racket string.

An objective of the invention is to provide a fully automatic racket stringing system capable of using the robot arm to pull a racket string with a required tension.

An objective of the invention is to provide a fully automatic racket stringing system capable of using the robot arm to twine or tie the racket string.

The invention provides a fully automatic racket stringing system including: two lens modules respectively capturing, at different two angles, a racket string hole on a racket at a first predetermined position, wherein the lens modules determine a first relative coordinate of the racket string hole according to the angles and a triangulation; and a control unit controlling a robot arm to grip the racket from an initial position, and to move the racket and place the racket at the first predetermined position; wherein the control unit controls the robot arm to move to a second predetermined position to grip a first end of a racket string, wherein after the first end of the racket string extends a predetermined length, the robot arm performs cutting off; wherein the control unit controls the robot arm to grip the first end or a second end of the racket string to pass through the racket string hole according to the first relative coordinate, or the control unit controls the robot arm to grip the first end or the second end of the racket string to tie in the racket string hole according to the first relative coordinate.

In one embodiment of the invention, after the control unit controls the robot arm to grip the racket, the robot arm moves the racket to a position in front of the lens modules, and an image of the racket is captured by the lens modules and compared with an abnormal racket database pre-stored in the control unit, wherein if the control unit judges as abnormal, then the robot arm moves the racket back to the initial position or moves the racket to the second predetermined position.

In one embodiment of the invention, the fully automatic racket stringing system includes: a racket string supplying unit, wherein the racket string is wound around the racket string supplying unit to make the first end of the racket string be located at the second predetermined position; and a racket string fixing unit for fixing the second end of the racket string after being cut off at a third predetermined position.

In one embodiment of the invention, when the second end of the racket string is fixed to the third predetermined position, the control unit controls the robot arm to grip the first end according to a second relative coordinate, and the control unit controls the robot arm according to the first relative coordinate to make the first end pass through the racket string hole.

DETAILED DESCRIPTION OF THE INVENTION

Figure 1:
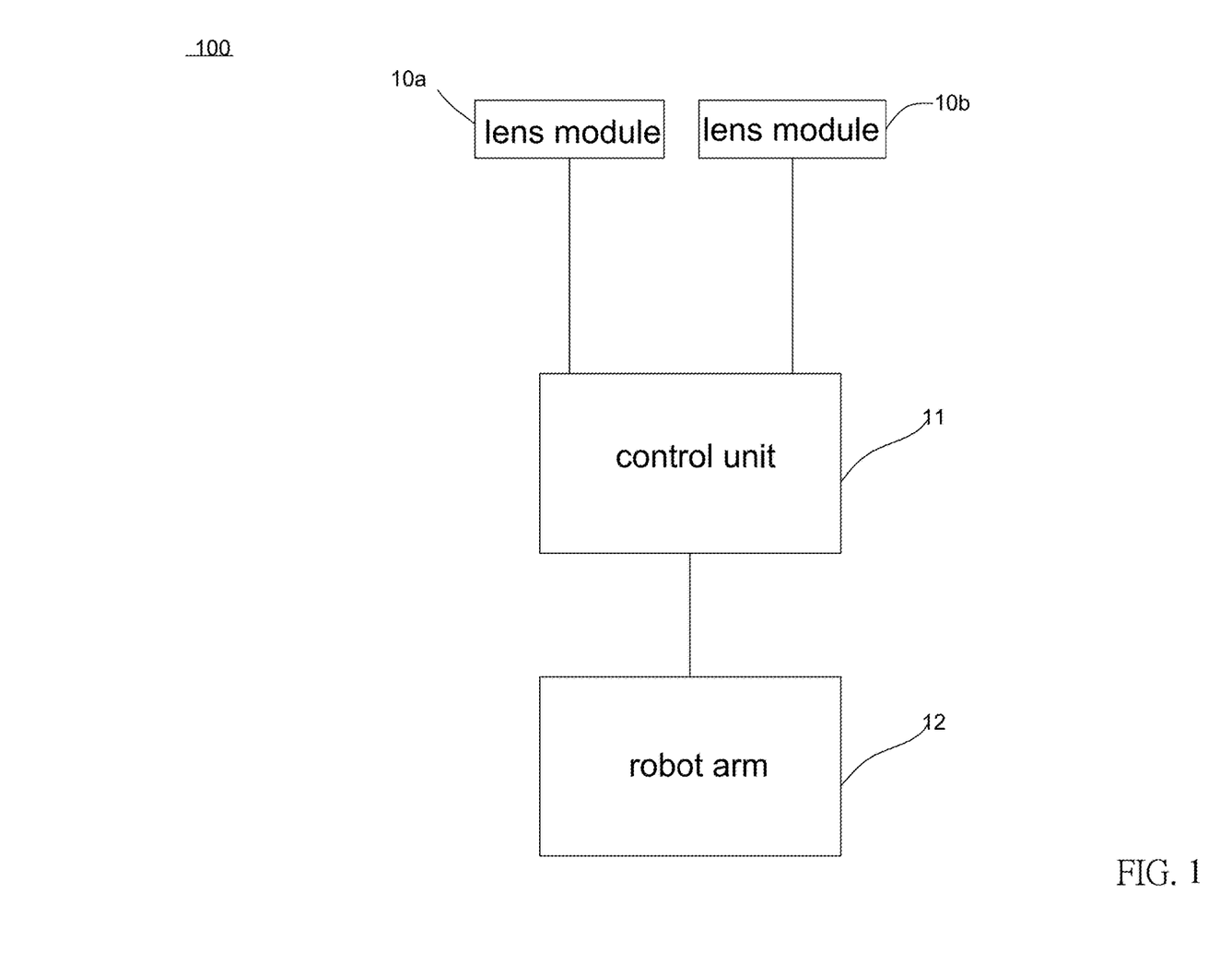
FIG. 1 is a schematic view showing a fully automatic racket stringing system in an embodiment of the invention.

FIG. 1 is a schematic view showing a fully automatic racket stringing system 100 in an embodiment of the invention. Referring to FIG. 1, the fully automatic racket stringing system 100 includes lens modules 10a and 10b, a control unit 11 and a robot arm 12.

In a first step, the control unit is initialized.

The power is turned on, and programs installed in the control unit are executed to enable the image capturing device to set the pounds (tension), to set the numbers of longitudinal and transverse holes for stringing, and to set to inspect and detect whether a time interval for a to-be-strung racket frame is present. The programs installed in the control unit include the program for inspecting the integrity of the racket, the program for detecting string head coordinates, the program for picking the string head, the program for detecting coordinates of racket string holes, the program for longitudinal stringing, the program for traverse stringing, the tying program (including the program for gripping the racket string), the program for cutting, the stringing process monitoring program, the program for abnormal alarm, the program for abnormal processing, and the database, such as the empty racket frame and various abnormal racket states, for program execution.

In addition, the stringing process monitoring program utilizes the lens modules 10a and 10b to fully monitor whether the robot arm has malfunction or not due to the accident, such as the string head falling or foreign object entering the working place. If yes, the current condition is recovered, and the processes are re-executed. Alternatively, if the force majeure, such as the machine failure or the broken racket, is present, then the alarm signal (audio or red light flashing signal) is outputted, and the stringing operation is stopped. The accident and the abnormal phenomenon or state are stored in the database of the control unit 11.

In a second step, it is detected whether a to-be-strung racket is present or not.

Figure 2:
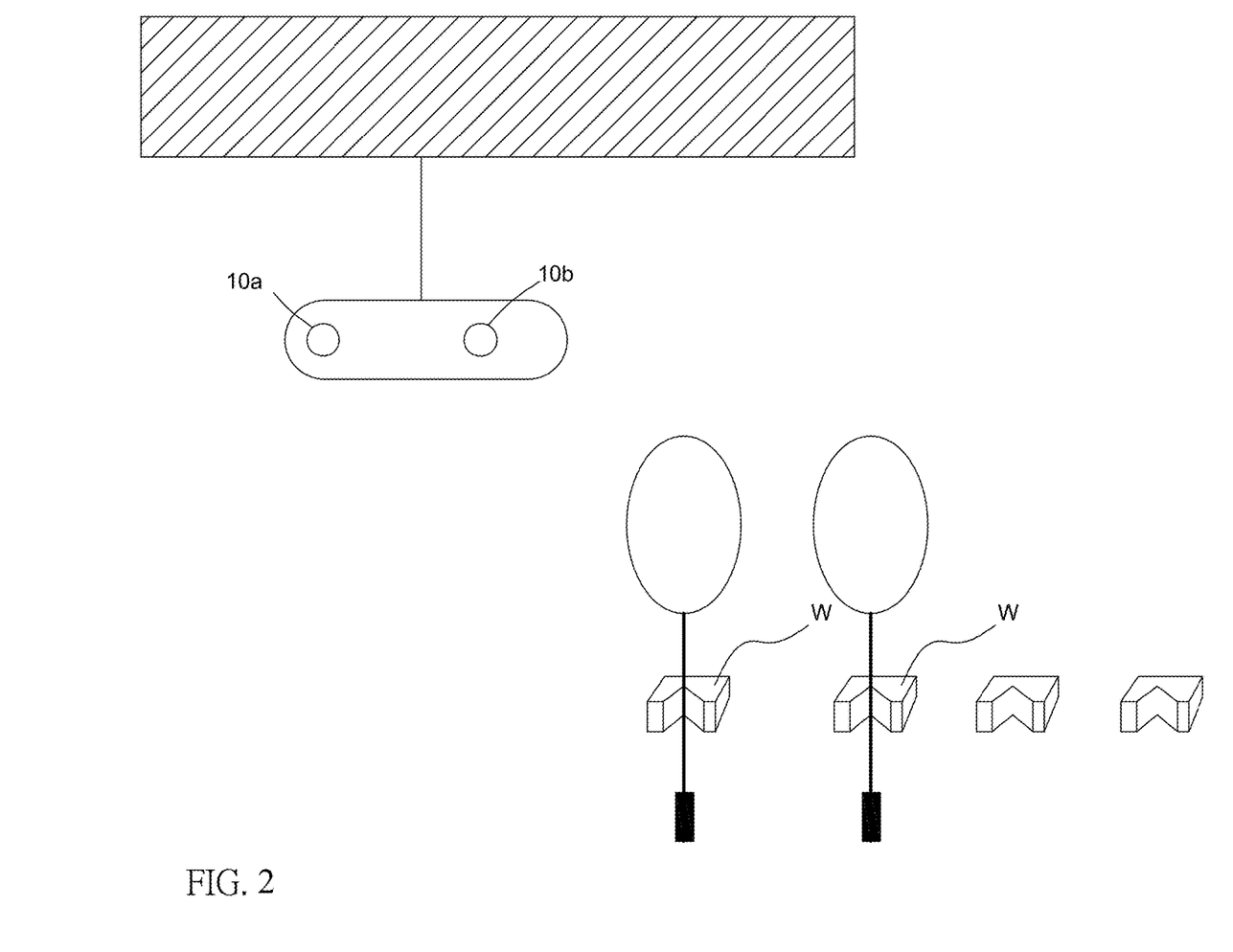
FIG. 2 shows lens modules being fixed at a specific position.

The control unit 11 adopts the lens modules 10a and 10b to detect whether the to-be-strung racket is present on a racket frame or not, wherein the lens modules 10a and 10b are fixed to the specific position, such as the racket frame W, as shown in FIG. 2. FIG. 2 shows lens modules being fixed at the specific position. In another embodiment, the lens modules 10a and 10b are fixed to the robot arm 12 to move with the movement of the robot arm 12. The lens modules 10a and 10b can perform the detection by comparing the image, obtained by the image capturing device every other predetermined time, with the image of the empty racket frame or the characteristic image of the racket pre-stored in the control unit 11, and the control unit 11 judges that the to-be-strung racket is placed on the racket frame W. In one embodiment of the fully automatic racket stringing system 100, a sensor or an indicator is mounted on the racket frame W, and the control unit 11 obtains the message that the to-be-strung racket is present according to the sensor or indicator.

In a third step, the robot arm picks up the racket.

Figure 3:
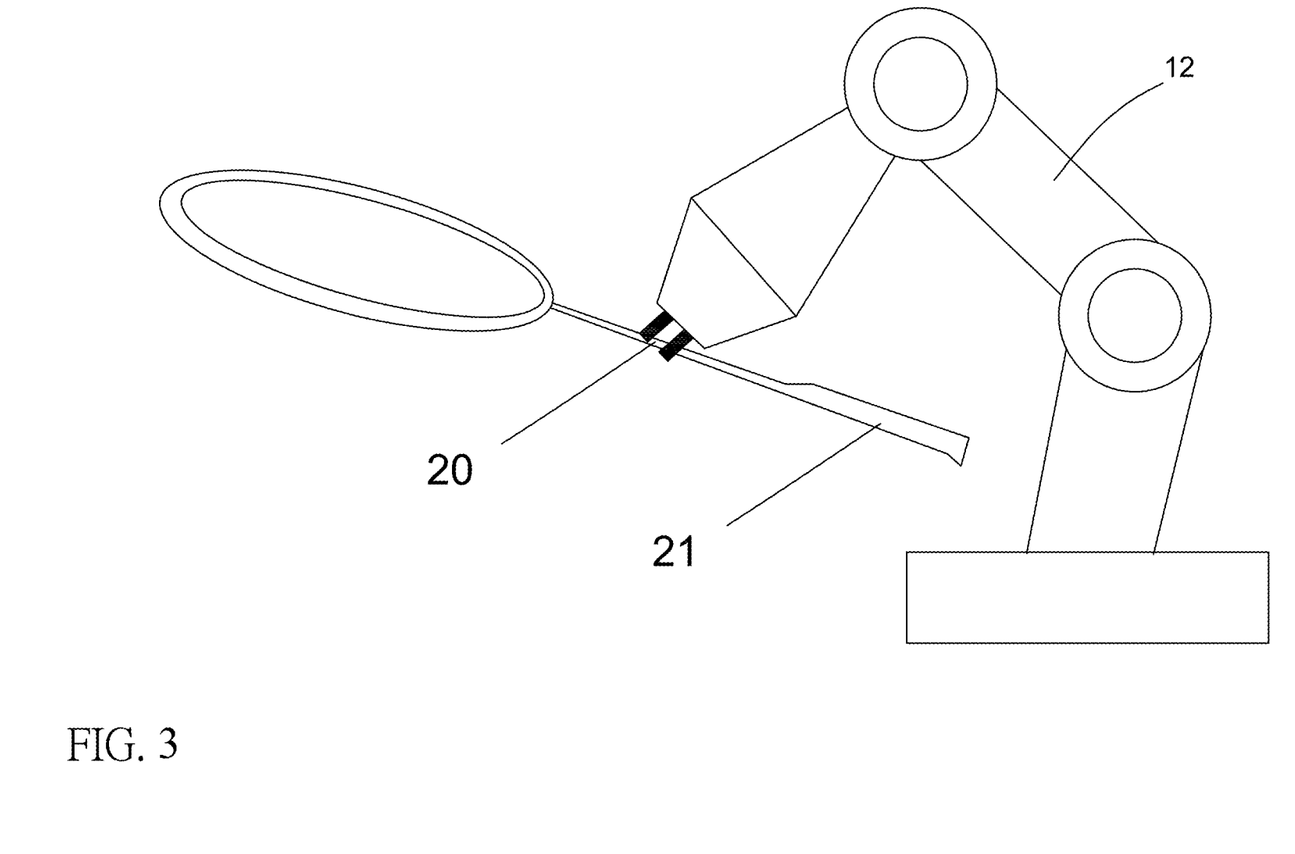
FIG. 3 is a schematic view showing a robot arm gripping a racket.

FIG. 3 is a schematic view showing a robot arm gripping racket. As shown in FIG. 3, the control unit 11 judges that the to-be-strung racket is placed at an initial position. In one embodiment, the initial position is set to be on the racket frame W, and the control unit 11 moves the robot arm 12 to the position of the racket frame to pick up the racket, so that the robot arm 12 can grip a racket middle shaft 20 or a handle 21. In one embodiment, two robot arms 12 are used to concurrently grip the middle shaft 20 and the handle 21 of the racket.

The robot arm 12 grips the racket and places the racket right ahead the lens module 10a or 10b to facilitate the subsequent inspection process. In one embodiment, because the racket frame and the lens modules 10a and 10b are fixed at the specified positions, the robot arm 12 can accurately and correctly perform this process with or without the lens modules 10a and 10b.

In a fourth step, the racket is inspected.

The objective of this step is to judge the integrity of the racket, and judge whether the stringing operation can be performed, wherein the integrity of the racket and the abnormality are pre-stored in the database of the computer. Basically, the surface of the racket having sharp lines, the incomplete circle of the racket string hole, or the skew phenomenon pertains to the abnormality. The control unit 11 controls the robot arm 12 to place the racket in front of the image capturing device, the robot arm 12 can rotate 180 degrees, 360 degrees or any other angle, and the lens module 10a or 10b is used to perform the comparison with the abnormal racket database stored in the control unit 11 to judge whether the racket has been strung or not (i.e., whether the abnormal condition is present). If the racket string is still present on the racket or the abnormality is judged, then the racket is moved back to the racket frame.

In one embodiment, the abnormality of the racket further includes the unbalanced racket, the crack, the broken racket, the skew and the like. The appearance of the racket can be inspected using the lens module 10a or 10b to detect whether it is horizontal. If the racket is placed horizontally, then the lens module 10a or 10b is moved in the X-axis horizontal direction. If the racket is normal, then the racket should have the constant Y-axis value. In another embodiment, the lens module 10a or 10b detects that the racket has the suspicious crack, the racket can be directly returned or the robot arm 12 may be further used to slightly touch the racket frame for confirmation (the robot arm similarly acts as a probe). A positive inspection method may also be used to input the characteristics of the normal racket, and any racket, which does not satisfy the normal characteristics, is judged as abnormal.

In a fifth step, the racket is placed at a predetermined position.

Figure 4:
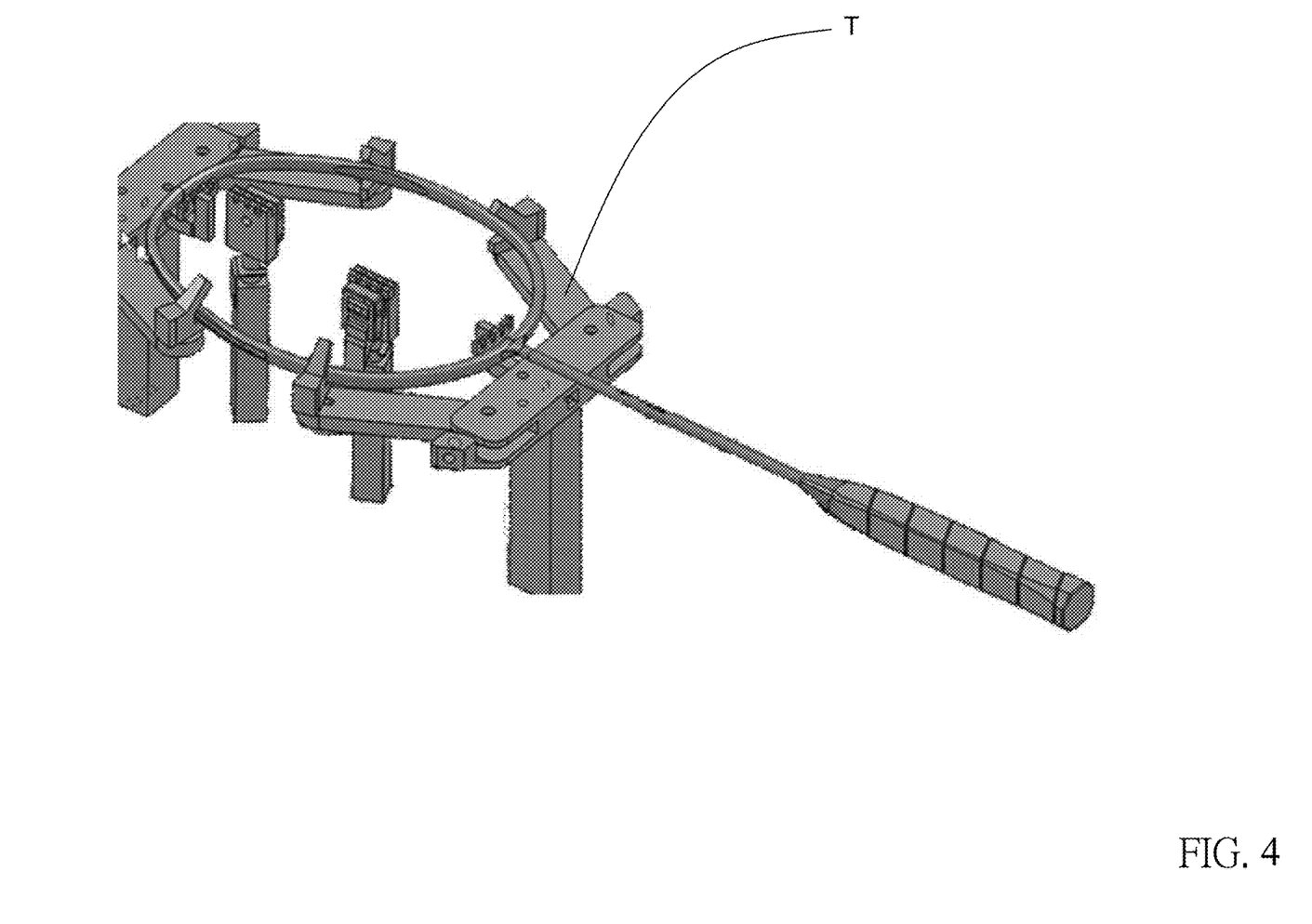
FIG. 4 is a schematic view showing the racket placed on a racket holder.

FIG. 4 is a schematic view showing the racket placed on a racket holder. As shown in FIG. 4, the robot arm 12 places the inspected racket at a first predetermined position. In this embodiment, the first predetermined position is set on a racket holder T. Because the rackets have different brands and different models, the racket frames may have slight differences, and the racket holder T needs to reserve the range for differences, so that the position can be automatically and finely adjusted to lock the racket frame. The automatic and fine adjustment can be performed by opening the fixing clamp to the maximum extents in advance to satisfy the rackets having the ranges of all brands and models, and then closing the clamp to the size satisfying this model. In addition, it is also possible to provide a protection buffer pad in the racket string hole according to the condition of the racket.

In a sixth step, the stringing is prepared.

Figure 5:
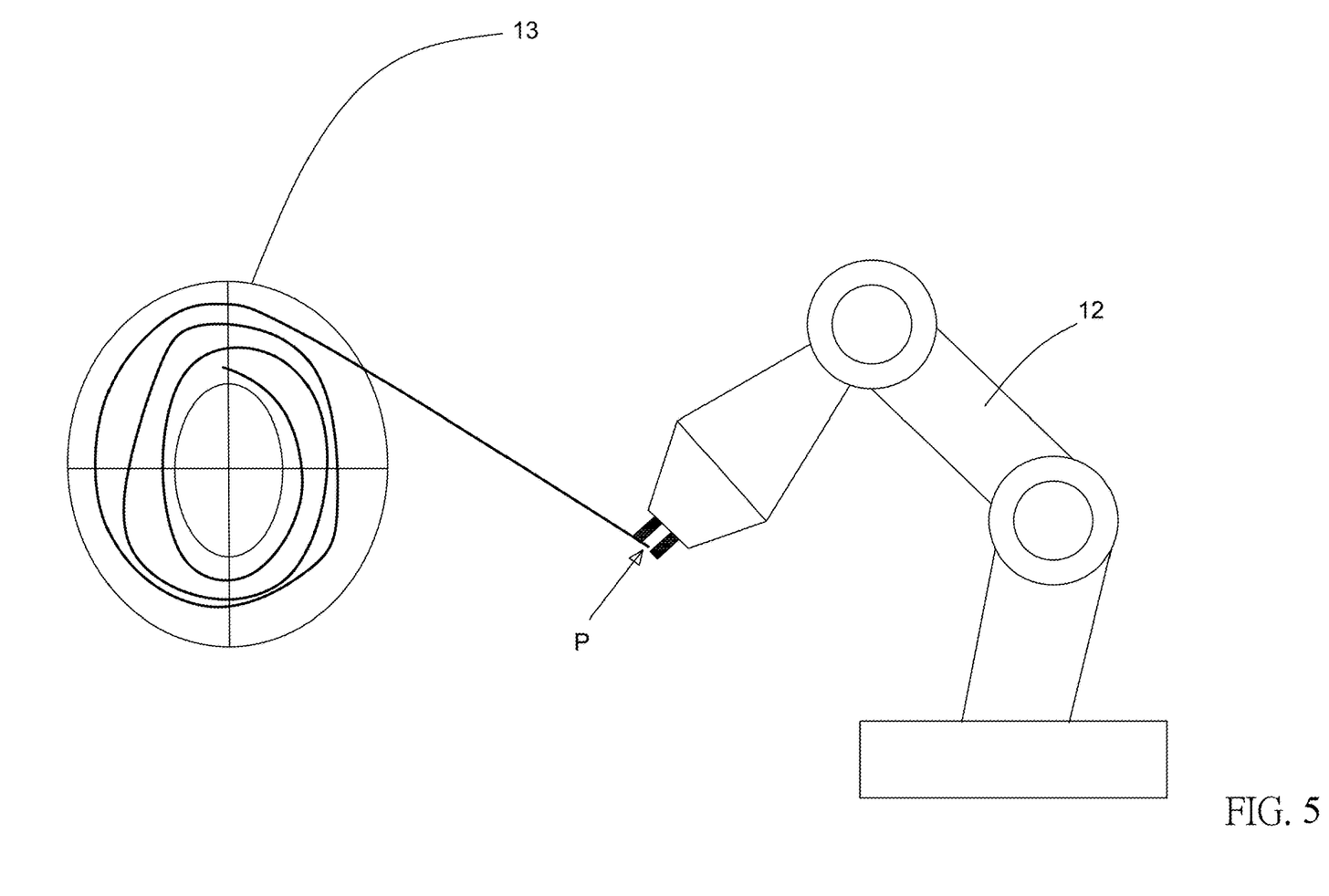
FIG. 5 shows that the robot arm is moved to a second predetermined position to grip a first end of a racket string.

FIG. 5 shows that the robot arm is moved to a second predetermined position to grip a first end P of a racket string. Referring to FIG. 5, the fully automatic racket stringing system 100 includes a racket string supplying unit 13 and a racket string fixing unit 14, wherein the racket string is wound around the racket string supplying unit 13, so that the first end P of the racket string is placed at the second predetermined position. The racket string fixing unit 14 fixes a second end Q of the racket string after being cut at a third predetermined position.

When the control unit 11 starts up the string head recognition program, the control unit 11 controls the robot arm 12 to move to the second predetermined position to grip the first end P of the racket string. In this embodiment, the second predetermined position is set as the position of the racket string supplying unit 13. That is, the robot arm 12 moves to the racket string supplying unit 13 to grip the string head of the racket string. After the first end P of the racket string extends a predetermined length, the robot arm 12 performs cut off to obtain the racket string with the predetermined length.

Figure 6:
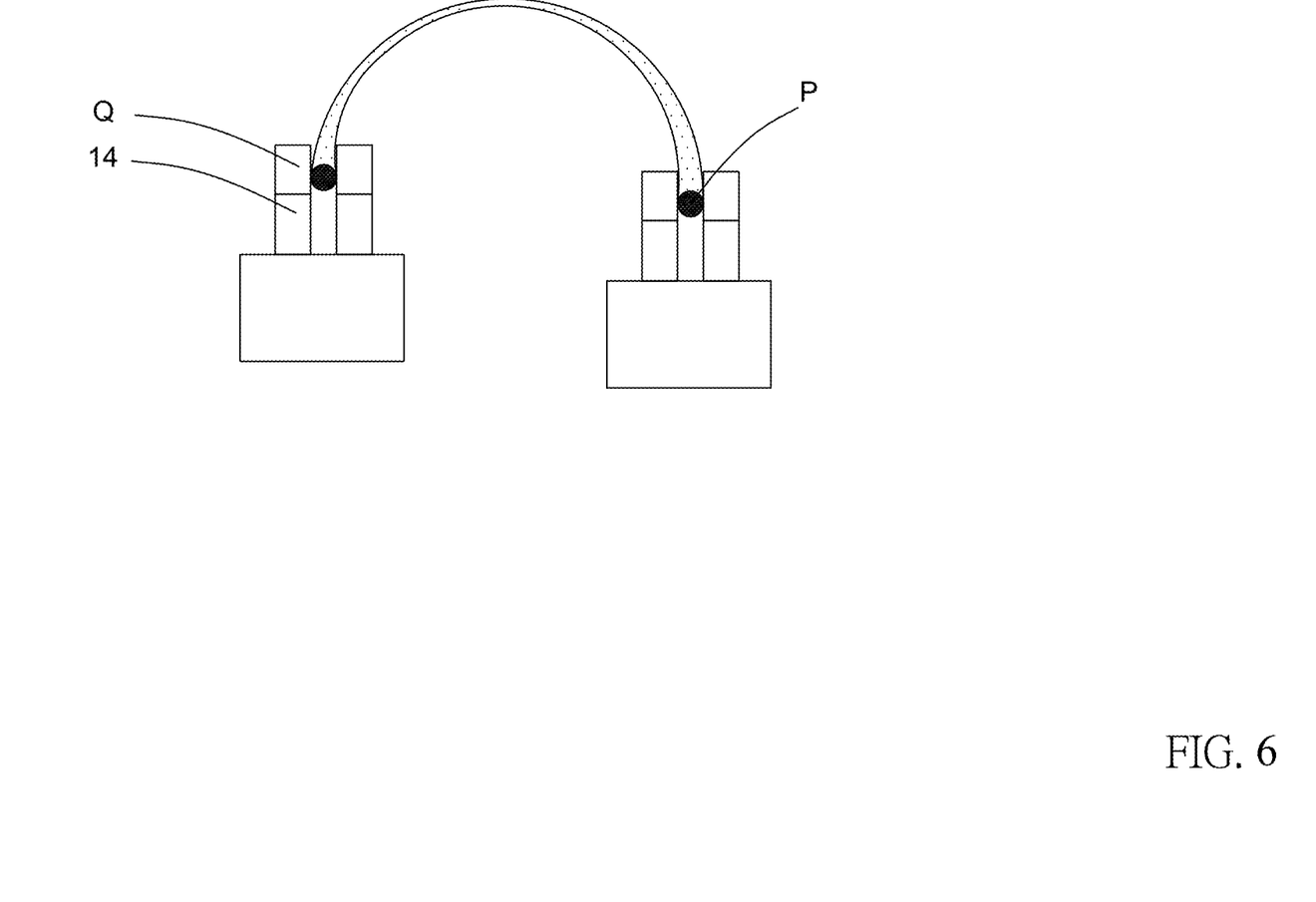
FIG. 6 is a schematic view showing the racket string fixed to a racket string fixing unit.

FIG. 6 is a schematic view showing the racket string fixed to a racket string fixing unit. Referring to FIG. 6, please note that the robot arm 12 moves to the racket string supplying unit to grip the string head and pull the racket string by a predetermined length and then cut off the racket string, and at least one end of the racket string after being cut off is fixed by the racket string fixing unit 14. In one embodiment, the robot arm 12 moves to the racket string supplying unit to grip the string head (or the first end P) and pull the racket string by the predetermined length, and then cut off the racket string, and the first end P and the second end Q of the racket string after being cut off are gripped and fixed by the racket string fixing unit 14.

At present, the racket stringing methods include a one-string method and a two-string method. The one-string method needs to cut off the racket string with a length of ten meters. In the two-string method, the longitudinal racket string generally needs to be 5.5 meters to be cut off, the length of the longitudinal string to be cut off is about 8.5 times of the total length required by the longitudinal string; and the traverse string generally needs 4.5 meters to be cut off, and the length of the traverse string to be cut off is about 6.5 times of the total length required by the traverse string. In one embodiment, the lens module 10a or 10b captures the first end and a second relative coordinate of the first end is calculated, and the position of the second end is calculated according to the predetermined length. Alternatively, a measurement ruler is used, and when the robot arm 12 grips and fixes the first end using the racket string fixing unit 14, and pulls the racket string by the predetermined length, the lens module 10a or 10b assists in confirming that the predetermined length is correct. Then, the robot arm 12 performs cut off, and finally the string head of the second end is gripped using another racket string fixing unit 14.

Please note that the longitudinal string is defined to be parallel to the racket handle 21, and the traverse string is defined to be perpendicular to the racket handle 21 in this embodiment.

There will be more possible stringing methods according to the fully automatic racket stringing system 100 because the three-string method, the four-string method or the multi-string method may also be implemented. In order to prevent the too-long string from falling in the stringing process, a hub may be provided to hold and protect the safety of the string, and to maintain the quality of the string while preventing the racket string from being V-shaped folded to affect the stringing quality. In addition, there may be two or more than two robot arms 12 to speed up the stringing operation.

In a seventh step, the position of the racket string hole is detected.

Figure 7:
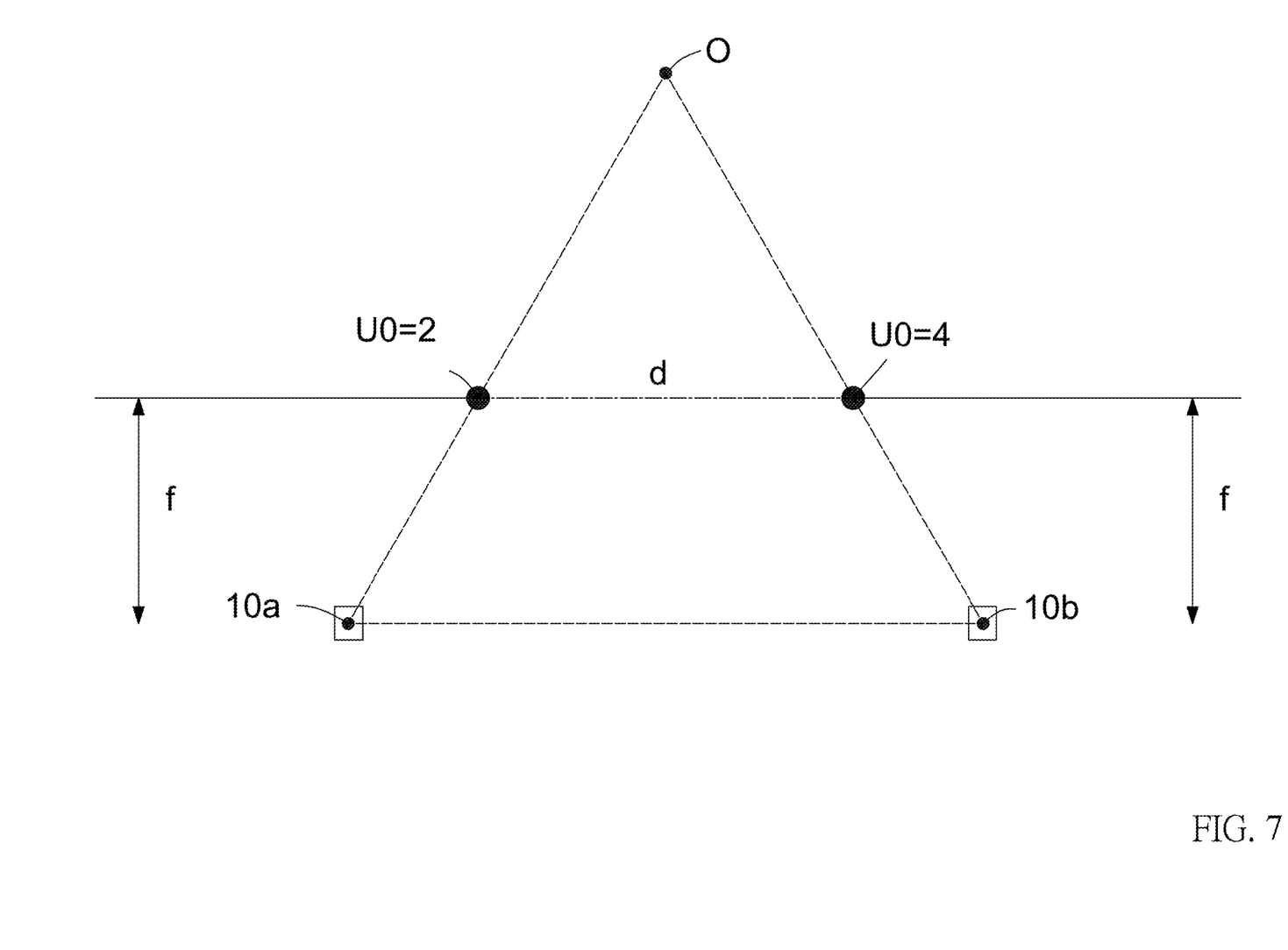
FIG. 7 is a schematic view showing a lens module for detecting and positioning a relative coordinate of the racket.

FIG. 7 is a schematic view showing a lens module for detecting and positioning a relative coordinate of the racket. Referring also to FIG. 7, the two lens modules 10a and 10b respectively capture a racket string hole O on a racket at a first predetermined position at different two angles, and the lens modules 10a and 10b respectively determine a first relative coordinate of the racket string hole O according to the two angles and a triangulation.

For example, if the coordinate of the lens module 10a is at the original (0,0,0), then the lens module 10b is set to be distant from the original in the X-axis direction by 6 units. That is, the lens module 10b is at the coordinate (6,0,0), the lens module 10a obtains the coordinate (U0=2) of the projection plane of the racket string hole O, and the lens module 10b obtains the coordinate (U1=4) of the projection plane of the racket string hole O. When the distance (b=6) is present between the lens module 10a and the lens module 10b, the focal length distance from the lens modules 10a and 10b to the projection plane is represented by f=2. So, the distance between the two projection planes is represented by d=U1−U0=2, and the first relative coordinate of the racket string hole O relative to the lens module 10a is represented by:

$$Z(depth)=f \times b/(b-d)=2 \times 6/4=3$$

$$X=U0 \times Z/f=2 \times 3/2=3$$

$$Y=y0 \times Z/f=0 \times 3/2=0 \text{ (the heights are the same in this example and equal to 0).}$$

In this case, the first relative coordinate of the racket string hole O is (3,0,3).

The objective of this step is to obtain the XYZ coordinate position of the racket string hole through multiple ways, such as the lens module, an infrared device, an acoustic wave detection device, a touch probe device or the like, and to obtain the XYZ (three-dimensional) coordinate position of the racket string hole.

In one embodiment, the structured-light active depth sensing technology is adopted to emit a specific pattern onto an object, a camera module receives pattern light coding from the surface of the object surface, the received results are compared with the original emitted pattern, and the three-dimensional (3D) coordinate of the object is calculated according to the triangulation principle. Upon the stringing application, the specific pattern is emitted onto the racket frame, the image recognition software is used to confirm the circular hole, the lens module receives the specific pattern light coding from the racket string hole, and the triangulation principle calculates the XYZ (three-dimensional) coordinate of the racket string hole.

In another embodiment, the time of flight (TOF) active depth sensing technology is utilized to calculate the distance to the racket string hole according to the time of flight of the infrared (IR), and thus to obtain the 3D depth of field. The basic components include an IR transmitter, an IR receiver, a RGB camera module and photosensitive members or a sensing array. Upon the stringing application, the TOF 3D camera is used to align with the racket frame, and the image recognition software is utilized to determine the circular hole. Applying the TOF 3D camera to align with the center of the racket string hole, the lens module displays the XYZ coordinate value of the center of the circular hole through the configuration software.

The lens module 10a or 10b in front of the racket performs image capturing, and the captured image is returned to the control unit 11. The control unit 11 analyzes the received image to obtain the position information of the racket string hole of the racket frame. The racket string hole can be determined by comparing the database of the racket string hole model, pre-stored in the control unit, with the image returned from the image capturing device, or utilizing the computer circle-recognition software program, or comparing the pre-stored circular hole data of the racket, such as the possible diameters, radii, dimensional ranges of the circular holes. It is also possible to determine the circular hole on the racket by utilizing the circular hole recognition software of the market-available image recognition software, such as Talkwalker, Proprietary image recognition technology, Google ReverseImage Search, Google API Cloud Vision, Amazon Rekognition, Clarifai, LogoGrab, IBM Image Detection, Imagga'Cloudsight, EyeEm and the like. After the racket string hole has been determined, the control unit 11 utilizes the lens modules to capture two images to constitute the 3D image, and then the precise 3D (X, Y, Z) coordinate of the center of the racket string hole can be obtained.

The lens module recognizes the racket string hole to obtain the XYZ coordinate by one, two or multiple cameras, 3d cameras, ToF cameras, and different sensing detectors may be combined to achieve this goal. For example, the camera and the laser collocate with each other, the camera and the acoustic wave collocate with each other, the camera and the probe collocate with each other, or multiple sensing detectors collocate with each other.

In an eighth step, the stringing operation is performed.

Figure 8A:
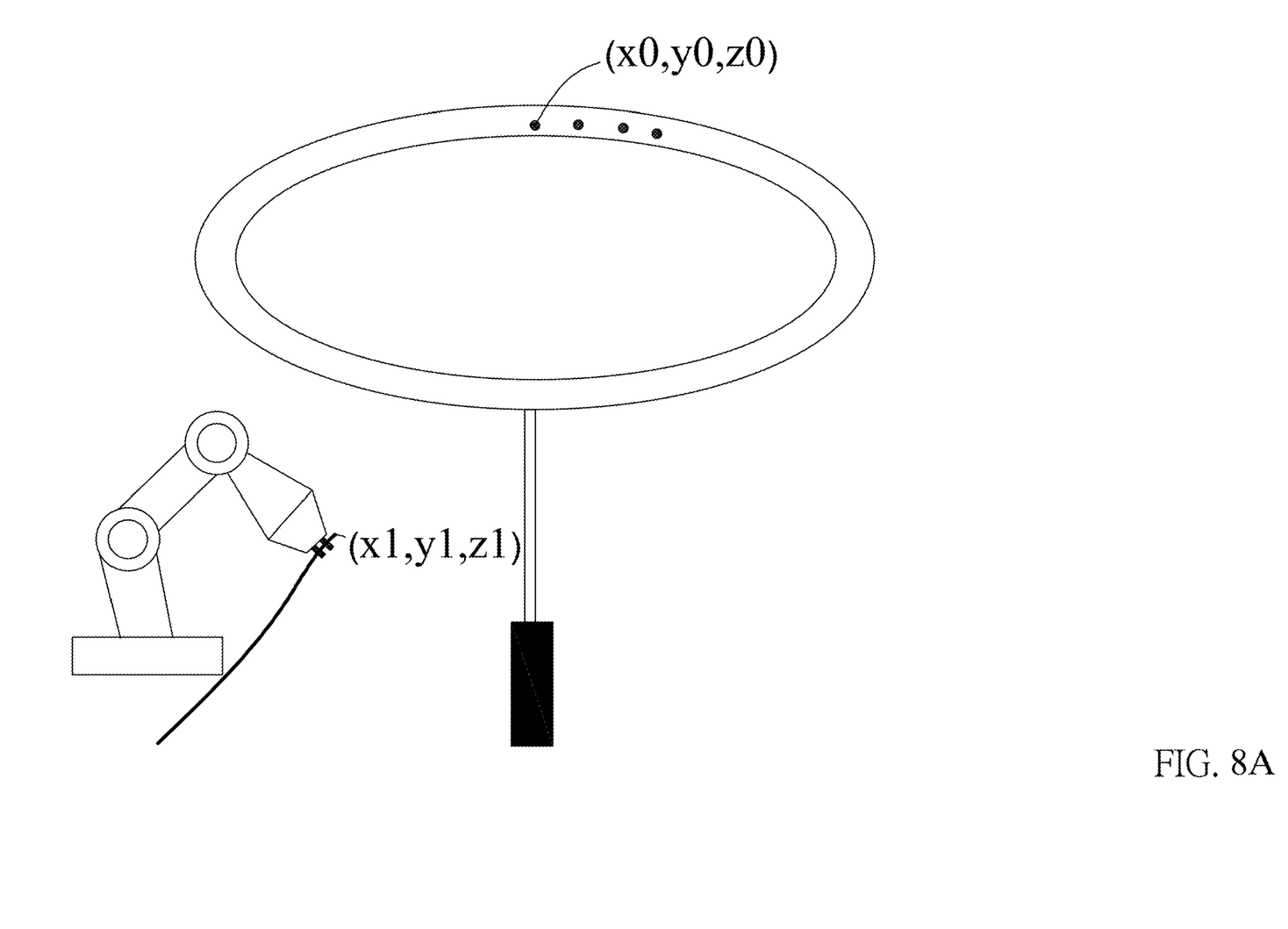
FIG. 8A shows a schematic view before the stringing operation.
Figure 8B:
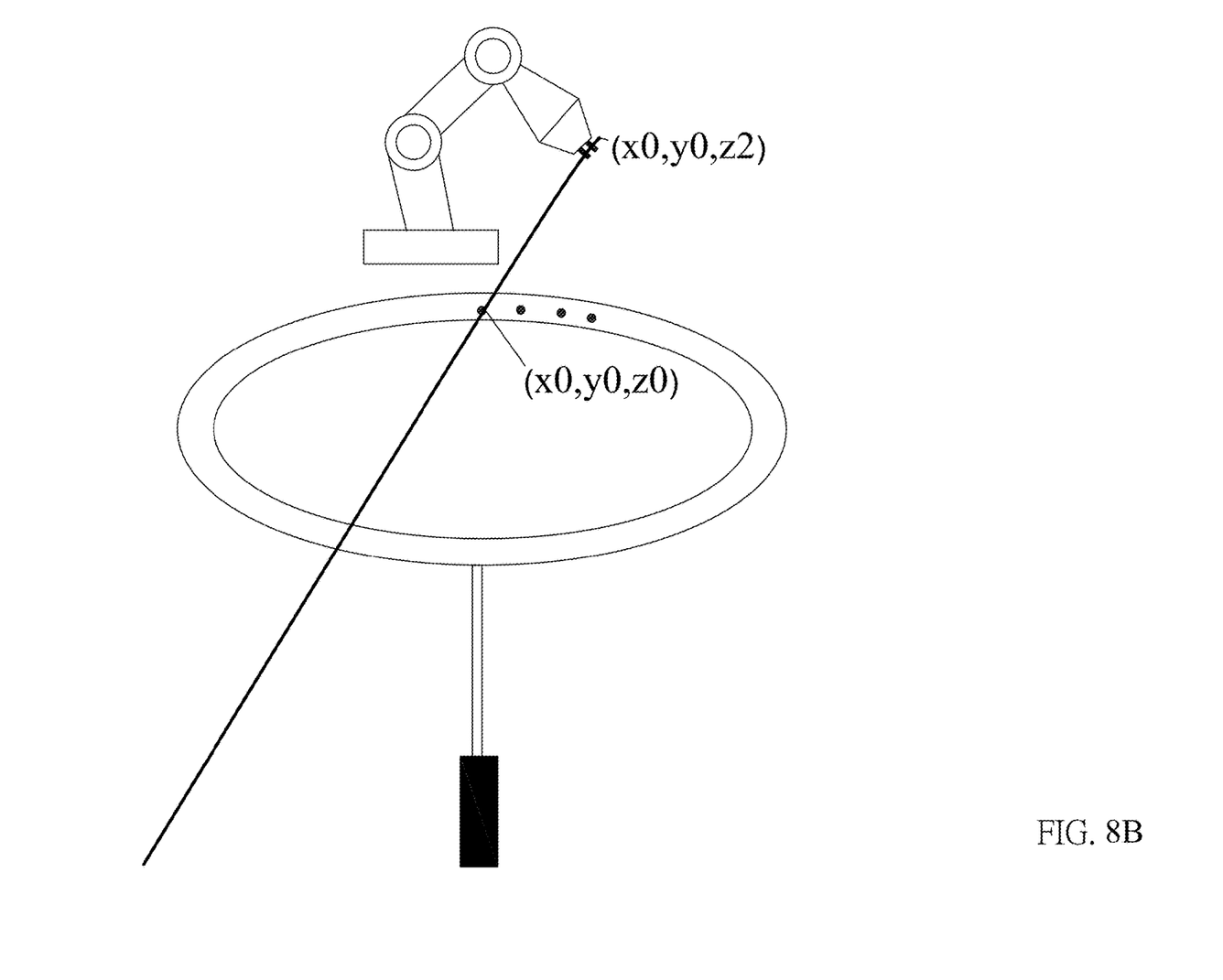
FIG. 8B shows a schematic view after the stringing operation.

FIGS. 8A and 8B respectively show schematic views before and after the stringing operation. Referring to FIGS. 8A and 8B, the control unit 11 controls the robot arm 12 to move to the racket string fixing unit 14 to pick up the first end of the racket string at the second predetermined position. When the robot arm 12 moves to the second predetermined position to grip the first end, the control unit 11 calculates the first relative coordinate as (x0,y0,z0) according to the lens module 10a or 10b. When the second relative coordinate is (x1,y1,z1), the robot arm 12 moves the first end from (x1,y1,z1) to (x0,y0,z2) to perform the longitudinal stringing process; where z2 denotes a translation in a Z-axis direction. In other words, when the camera obtains the coordinate of the string head and the first relative coordinates of racket string holes, the string head is moved from the string head coordinate (x1,y1,z1) to the first relative coordinate (x0,y0, z0) of the position of the racket string hole, and then the robot arm 12 pushes the string head to pass through the racket string hole of the racket frame in the Z-axis direction.

Similarly, the second end of the racket string (i.e., the other string head) may also be operated at the same time as mentioned hereinabove, wherein the robot arm 12 starts from the upright middle portion of the racket frame, and sequentially extends toward two sides to string due to the balanced consideration of the tension, so that the longitudinal stringing process is performed. In the stringing process, when the two ends of the racket string are not on the robot arm 12, the two ends of the racket string are always placed on the racket string fixing unit 14.

The robot arm 12 can directly pull the string to the required pounds according to the string-pulling pounds (e.g., 26 pounds) in the initial setting parameters. In another embodiment, a tension string puller is used to pull the racket string to reach the required pounds. After the robot arm 12 or the tension puller has pulled the racket string to the predetermined position, the racket string fixing unit 14 automatically fixes the racket string satisfying the tension strength. In one embodiment, the racket holder T may be satisfied by a simple type robot arm, which is movable in any direction to clamp the racket string, so that the robot arm 12 can perform the stringing for the next racket string hole, and sequentially finish the longitudinal stringing.

In a ninth step, tying is performed after the longitudinal stringing is finished.

Figure 9A:
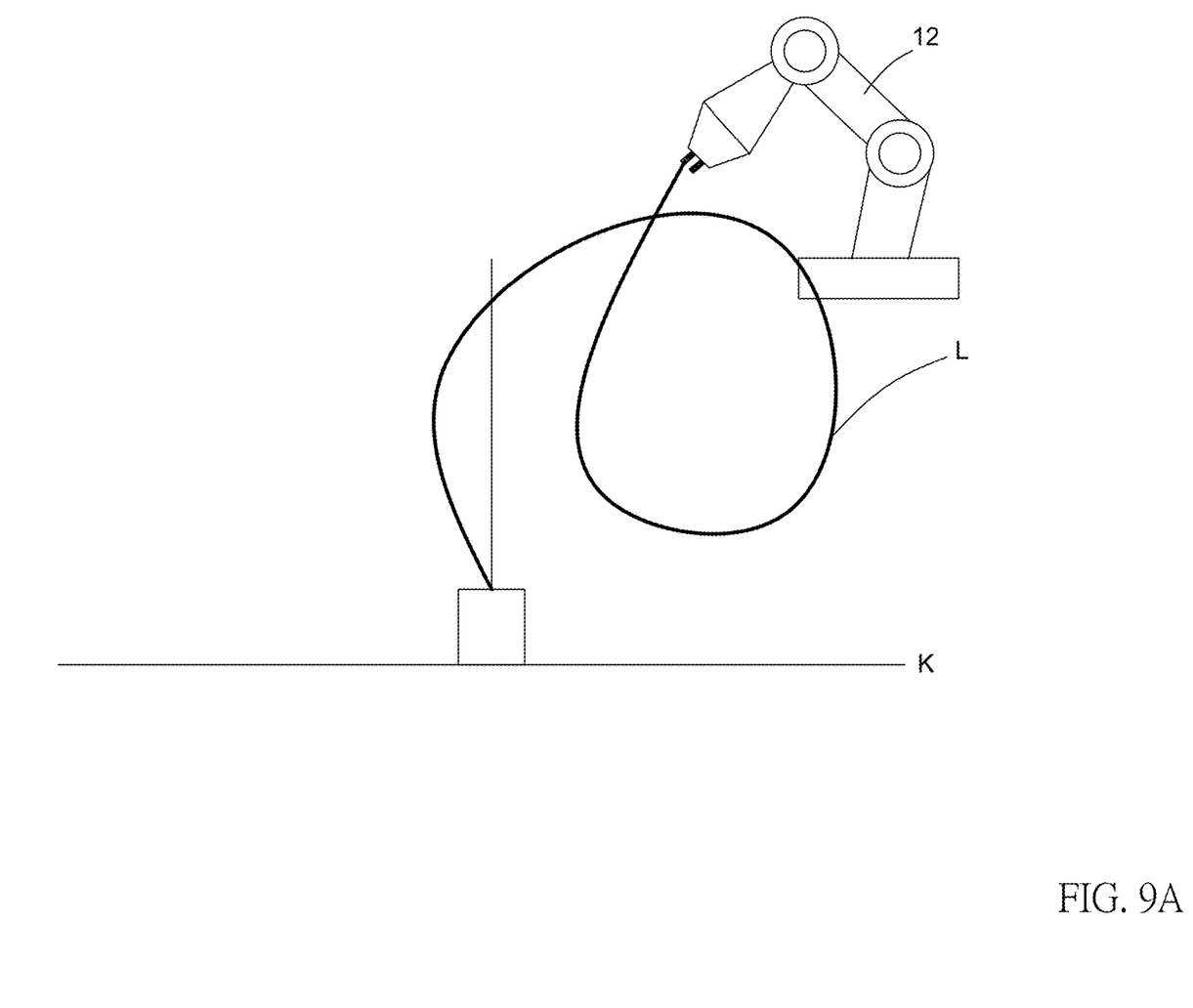
FIG. 9A is a schematic view showing tying of the invention.
Figure 9B:
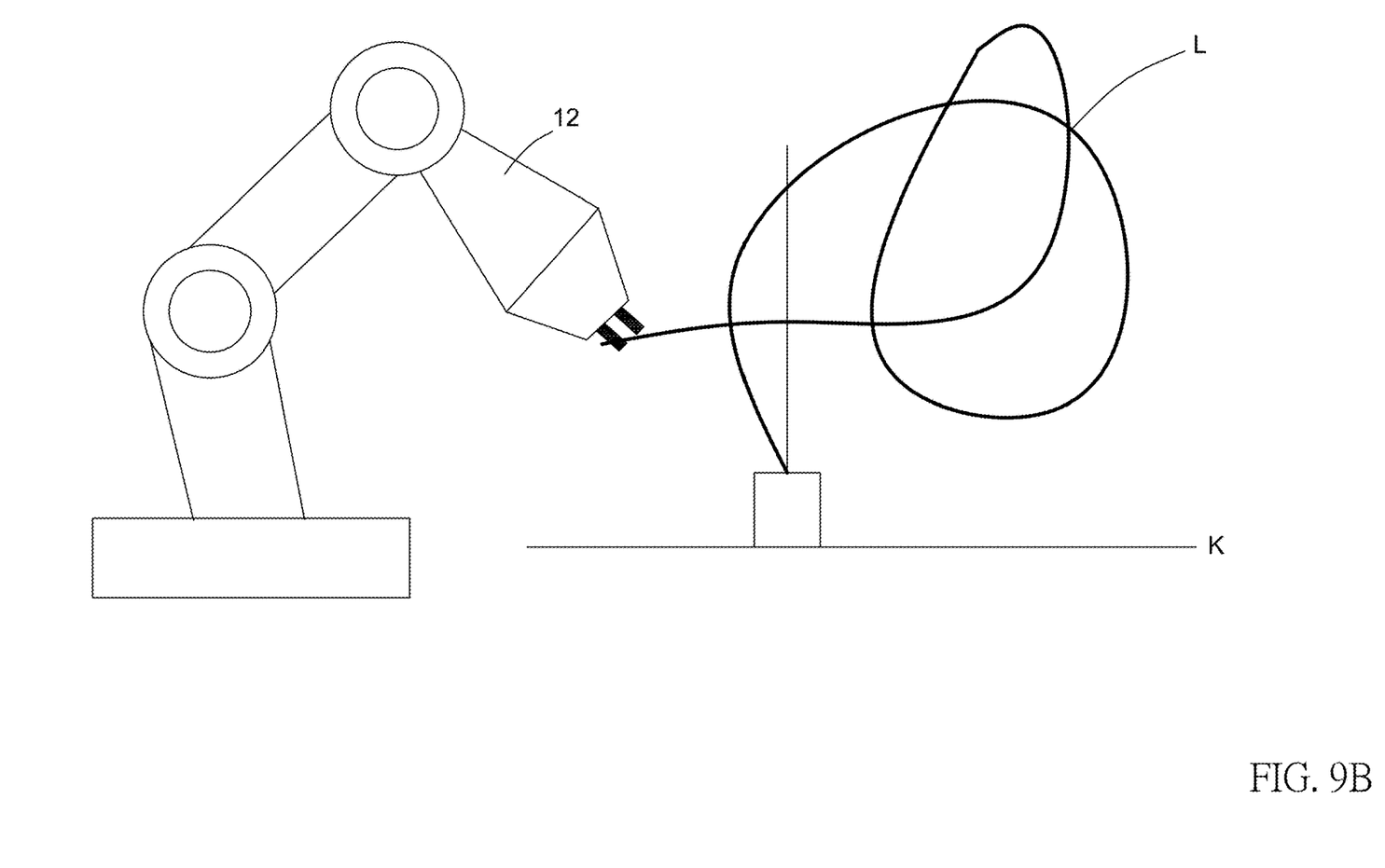
FIG. 9B is a schematic view showing tying of the invention.

FIGS. 9A and 9B are schematic views showing tying of the invention. Referring to reference FIGS. 9A and 9B, after the longitudinal stringing is finished, the control unit 11 controls the robot arm 12 to perform the tying and cutting processes. The tying can be performed by the robot arm 12, which is controlled by the control unit 11 to perform tying at the location near the final or initial racket string hole. One robot arm 12 grips the region near the string head of the racket string to rotate to make the racket string generate at least one racket loop L, and then the other robot arm 12 grips the string head to pass through the racket loop L. Finally, the robot arm 12 cuts off the excess racket string to finish tying, wherein the line K shows the inner wall of the racket frame.

In a tenth step, the traverse stringing starts, and the string is cut after tying.

The traverse stringing needs not to start from the racket string hole in the middle region of the racket. That is, the stringing can start from the racket string hole in the top region of the racket, or the racket string hole in the bottom region of the racket. When the traverse string passes through the longitudinal string, the lens module 10a or 10b needs to be used to confirm whether the traverse string and the longitudinal string form the alternate stringing (i.e., the traverse string passes by and above the longitudinal string at a first time, and passes by and below the next longitudinal string, and so on until the racket string holes on the racket frame are strung). The operation method is the same as the tying and cutting of the longitudinal stringing after the stringing is finished, and detailed descriptions thereof will be omitted here.

In summary, the invention utilizes the fully automatic racket stringing system to achieve the full automatic process without the artificial stringing, can increase the stability and consistency of the racket, and thus can increase the throughput of the racket. In addition, when the racket has the broken racket string in the used process, the replacement of the racket string on the racket also has the huge market business opportunity. The invention can be used when the new racket is being manufactured and when the racket string of the old racket needs to be replaced.

What is claimed is:

1. A fully automatic racket stringing system, comprising:
   two lens modules respectively capturing, at different two angles, a racket string hole on a racket at a first predetermined position, wherein the lens modules determine a first relative coordinate of the racket string hole according to the angles and a triangulation;
   a robot arm has a function of cutting off;
   a control unit storing a plurality of programs, the first predetermined position, an initial position, and a second predetermined position; and
   a racket string supplying unit, a racket string is wound around the racket string supply unit to make the first end of the racket string be located at the second predetermined position;
   wherein the control unit executes multiple programs to perform the following steps:
   controlling the robot arm to grip the racket from the initial position, and to move the racket and place the racket at the first predetermined position;
   executing a string head recognition program among the programs to control the robot arm to move to the second predetermined position to grip the first end of a racket string, wherein after the first end of the racket string extends a predetermined length, the robot arm performs cutting off;
   the lens modules capture the first end and calculate the second relative coordinate of the first end;
   the step of controlling the robot arm to grip the first end of the racket string to pass through the racket string hole according to the first relative coordinate includes the following steps:
   controlling the robot arm to grip the first end of the racket string and move the first end from the second relative coordinate to the first relative coordinate, and execute a longitudinal stringing process among the programs.

2. The fully automatic racket stringing system according to claim 1, wherein after the control unit execute the programs to controls the robot arm to grip the racket, the robot arm moves the racket to a position in front of the lens modules, and an image of the racket is captured by the lens modules and compared with an abnormal racket database pre-stored in the control unit, wherein if the control unit judges the racket as abnormal, then the robot arm moves the racket back to the initial position.

3. The fully automatic racket stringing system according to claim 2, wherein the control unit executes the programs to further perform the following steps:
  the robot arm grips a middle shaft or a handle of the racket according to the first relative coordinate of the racket string hole; and an appearance of the racket can be inspected using the lens modules to detect whether it is horizontal.

4. The fully automatic racket stringing system according to claim 3, wherein the system comprises:
  a racket string fixing unit for fixing a second end of the racket string after being cut off at a third predetermined position.

5. The fully automatic racket stringing system according to claim 4, wherein after the robot arm grips the first end at the second predetermined position and after the robot arm pulls the first end to extend the predetermined length, the robot arm performs cutting off to obtain the racket string with the predetermined length.

6. The fully automatic racket stringing system according to claim 5, wherein the step of capturing the first end by the lens modules to calculate a second relative coordinate of the first end further includes calculating a position of the second end according to the predetermined length.

7. The fully automatic racket stringing system according to claim 6, wherein the control unit executes the programs to further perform the following steps:
  when the second end of the racket string is fixed to the third predetermined position, the control unit controls the robot arm to grip the first end according to the second relative coordinate, and the control unit controls the robot arm according to the first relative coordinate to make the first end pass through the racket string hole.

8. The fully automatic racket stringing system according to claim 7, wherein the control unit executes the programs to further perform the following steps:
  when one of the ends of the racket string is fixed to the third predetermined position, the robot arm pulls the racket string at the other of the ends of the racket string to generate predetermined pounds of tension.

9. The fully automatic racket stringing system according to claim 7, wherein the control unit calculates the first relative coordinate as (x0,y0,z0) and the second relative coordinate as (x1,y1,z1) according to the lens modules, the step of controlling the robot arm to grip the first end of the racket string to pass through the racket string hole according to the first relative coordinate includes:
  the robot arm moves the first end from the second relative coordinate (x1,y1,z1) to the first relative coordinate (x0,y0,z0), the robot arm pushes the first end along a Z-axis direction to pass through the racket string hole, and move the first end to (x0,y0,z2); where z2 denotes a translation in the Z-axis direction.

10. The fully automatic racket stringing system according to claim 1, wherein the control unit executes a tying program of the programs to further perform the following steps:
  the control unit controls the robot arm to perform tying near the racket string hole, which is a first one or a last one, and the robot arm grips a nearby region of the first end or the second end of the racket string to rotate, so that the racket string forms at least one racket loop, and then another robot arm grips the first end or the second end to pass through the racket loop.

* * * * *